(12) United States Patent
Baughman et al.

(10) Patent No.: US 11,874,844 B2
(45) Date of Patent: *Jan. 16, 2024

(54) AUTOMATIC NEUTRAL POINT OF VIEW CONTENT GENERATION

(71) Applicant: International Business Machines Corporation, Armonk, NY (US)

(72) Inventors: Aaron K. Baughman, Cary, NC (US); Gray Franklin Cannon, Atlanta, GA (US); Stephen C Hammer, Marietta, GA (US); Shikhar Kwatra, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,701

(22) Filed: Mar. 9, 2023

(65) Prior Publication Data
US 2023/0214411 A1 Jul. 6, 2023

Related U.S. Application Data

(63) Continuation of application No. 17/204,373, filed on Mar. 17, 2021, now Pat. No. 11,687,539.

(51) Int. Cl.
*G06F 17/00* (2019.01)
*G06F 7/00* (2006.01)
(Continued)

(52) U.S. Cl.
CPC .... *G06F 16/24578* (2019.01); *G06F 16/2246* (2019.01); *G06F 16/243* (2019.01);
(Continued)

(58) Field of Classification Search
CPC ............ G06F 16/24578; G06F 16/243; G06F 16/322; G06F 16/2246; G06F 16/248; G06F 16/355; G06F 40/40
(Continued)

(56) References Cited

U.S. PATENT DOCUMENTS

2002/0042711 A1* 4/2002 Lin ...................... G10L 15/1822
704/E15.026
2002/0059202 A1* 5/2002 Hadzikadic ........... G06F 16/355
707/999.003
(Continued)

OTHER PUBLICATIONS

List of all IBM related dockets, 2023.

*Primary Examiner* — Pavan Mamillapalli
(74) *Attorney, Agent, or Firm* — Garg Law Firm, PLLC; Rakesh Garg; Michael O'Keefe

(57) ABSTRACT

From a set of natural language text documents, a concept tree is constructed. For a node in the concept tree a polarity of the subset represented by the node is scored. A second set of natural language text documents is added to the subset, the adding resulting in a modified subset of natural language text documents having a polarity score within a predefined neutral polarity score range. From the modified subset, a bin of sentences is selected according to a sentence selection parameter, a sentence in the bin of sentences being extracted from a selected document in the modified subset. A sentence having a factuality score below a threshold factuality score is removed from the bin of sentences. From the filtered bin of sentences a new natural language text document corresponding to the filtered bin of sentences is generated using a transformer deep learning narration generation model.

25 Claims, 15 Drawing Sheets

(51) Int. Cl.
    *G06F 16/2457* (2019.01)
    *G06F 16/22* (2019.01)
    *G06F 16/248* (2019.01)
    *G06F 16/242* (2019.01)
    *G06F 16/31* (2019.01)
    *G06F 16/35* (2019.01)
    *G06F 40/40* (2020.01)

(52) U.S. Cl.
    CPC .......... *G06F 16/248* (2019.01); *G06F 16/322* (2019.01); *G06F 16/355* (2019.01); *G06F 40/40* (2020.01)

(58) Field of Classification Search
    USPC .......................................................... 707/748
    See application file for complete search history.

(56) References Cited

U.S. PATENT DOCUMENTS

| | | | | |
|---|---|---|---|---|
| 2002/0107844 | A1* | 8/2002 | Cha | G06F 16/3344 707/E17.078 |
| 2003/0041040 | A1* | 2/2003 | Bertrand | G09B 7/04 706/12 |
| 2003/0041047 | A1* | 2/2003 | Chang | G06F 16/40 707/999.001 |
| 2012/0259617 | A1* | 10/2012 | Indukuri | G06F 40/279 704/9 |
| 2015/0112753 | A1* | 4/2015 | Suvarna | H04L 51/52 705/7.29 |
| 2015/0286627 | A1* | 10/2015 | Chang | G06F 40/205 704/9 |
| 2017/0034173 | A1* | 2/2017 | Miller | H04L 63/10 |
| 2018/0349476 | A1* | 12/2018 | Carmeli | G06F 16/345 |
| 2020/0143000 | A1* | 5/2020 | Childs | G06F 16/248 |

\* cited by examiner

AUTOMATIC NEUTRAL POINT OF VIEW CONTENT GENERATION

BACKGROUND

The present invention relates generally to a method, system, and computer program product for content generation. More particularly, the present invention relates to a method, system, and computer program product for automatic neutral point of view content generation.

Content is information directed towards an end-user. Content includes both natural language text and structured representations of natural language text, as well as non-textual modalities, such as audio and video, that can be converted to text. Some non-limiting examples of content include books, articles, movies, electronic mail messages, text messages, and social media messages in text, audio, and video forms. An individual unit of content is also referred to as a document.

The illustrative embodiments recognize that most content, whether created by a human or a machine, implicitly or explicitly expresses a point of view or opinion. Further, humans and machines influence each other within the content discovery process. Users perform content discovery by searching for particular key words, which they may have been exposed to via their previous content consumption and the results of previous searches. Machine-implemented content management systems, data retrieval algorithms, and recommendation systems consider popularity, relevance, provenance, and a user's previous content consumption when ranking and selecting content to expose to a user, thus reinforcing popular points of view or points of view that are often similar to those of a user's previous content consumption. As a result, content users may not be able to access factual content, and are instead presented with content that tends to reinforce a particular perspective while ignoring other perspectives. In addition, both human and machine content users and content creators may not even be aware of content and points of view outside their particular perspective that could be incorporated into their own content. Thus, the illustrative embodiments recognize that there is an unmet need to automatically generate factual content with a neutral point of view.

SUMMARY

The illustrative embodiments provide a method, system, and computer program product. An embodiment includes a method that constructs, from a set of natural language text documents, a concept tree, a node of the concept tree representing a subject of a subset of the set of natural language text documents (subset), a level of the concept tree corresponding to a degree of specificity of a subject of a node in the level. An embodiment scores, for a node in the concept tree (node) using a trained polarity scoring model, a polarity of the subset represented by the node. An embodiment adds a second set of natural language text documents to the subset, the adding resulting in a modified subset of natural language text documents, the modified subset having a polarity score within a predefined neutral polarity score range. An embodiment selects, from the modified subset according to a sentence selection parameter, a bin of sentences, a sentence in the bin of sentences extracted from a selected document in the modified subset. An embodiment removes, from the bin of sentences, the removing resulting in a filtered bin of sentences, a sentence having a factuality score below a threshold factuality score. An embodiment generates, from the filtered bin of sentences using a transformer deep learning narration generation model, a new natural language text document corresponding to the filtered bin of sentences. Thus, an embodiment provides a method of automatic neutral point of view content generation.

In another embodiment, the bin of sentences further comprises sentences extracted from a document represented by a second node of the concept tree, wherein the second node is a parent node of the node. Thus, the embodiment provides a particular manner of selecting the bin of sentences.

In another embodiment, the bin of sentences further comprises sentences extracted from a document represented by a third node of the concept tree, wherein the third node is a child node of the node. Thus, the embodiment provides a particular manner of selecting the bin of sentences.

In another embodiment, the factuality score of a sentence is determined by comparing the sentence to a search result of a search within a repository of factual information. Thus, the embodiment provides a particular manner of computing the factuality score.

In another embodiment, the search within the repository of factual information is performed using a structured representation of the sentence and a structured representation of a textual variant of the sentence. Thus, the embodiment provides a particular manner of performing the search used in computing the factuality score.

Another embodiment further includes generating, from the filtered bin of sentences, a structured description of the filtered bin of sentences. Thus, the embodiment generates new content including a structured description of the filtered bin of sentences.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

An embodiment includes a data processing environment. The data processing environment includes one or more processors, one or more computer-readable memories, and one or more computer-readable storage devices, and program instructions stored on at least one of the one or more storage devices for execution by at least one of the one or more processors via at least one of the one or more memories.

An embodiment includes a natural language processing system. The natural language processing system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
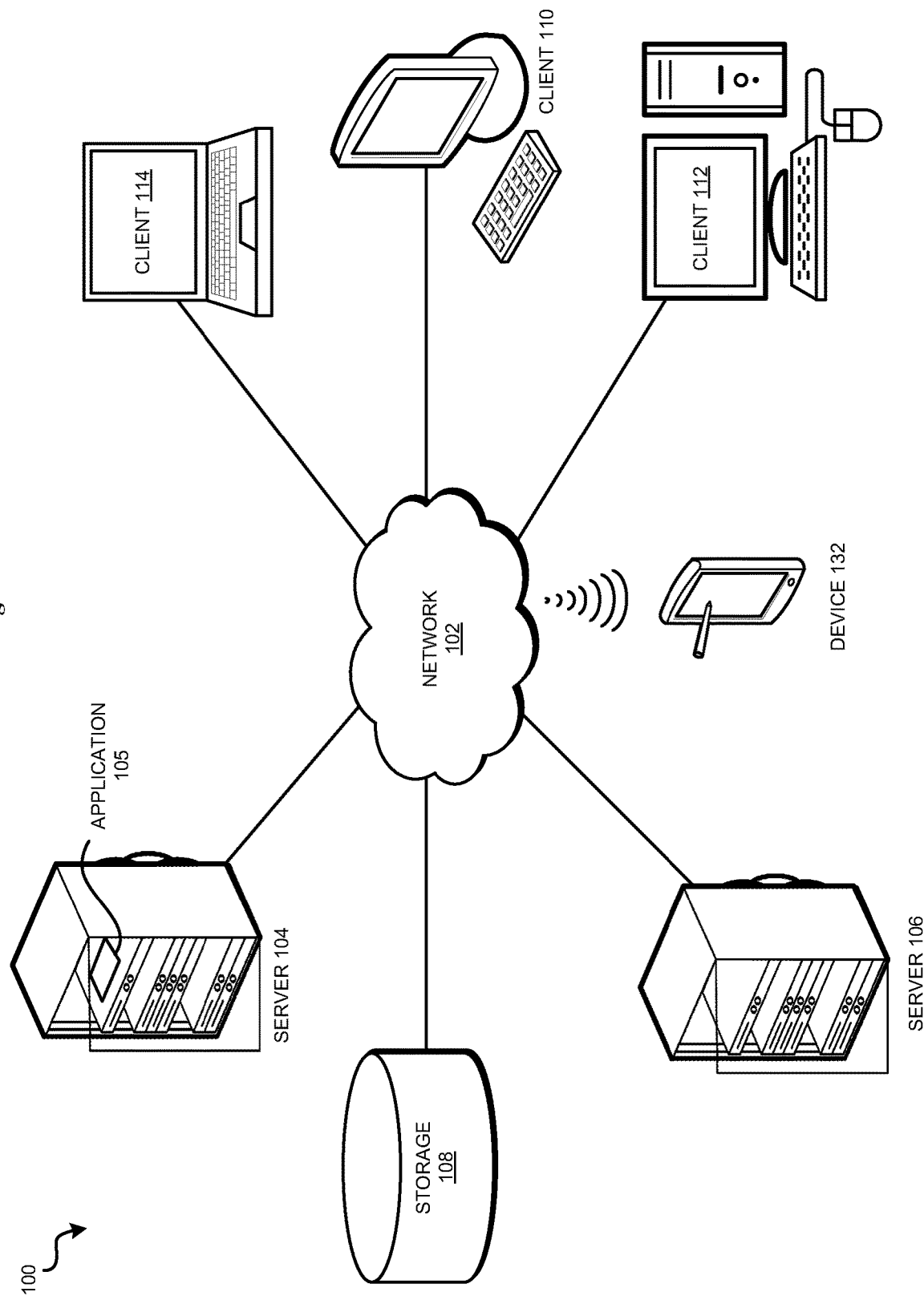
FIG. 1 depicts a block diagram of a network of data processing systems in which illustrative embodiments may be implemented.

The illustrative embodiments recognize that there is an unmet need to automatically generate factual content with a neutral point of view. The illustrative embodiments recognize that the presently available tools or solutions do not address these needs or provide adequate solutions for these needs. The illustrative embodiments used to describe the invention generally address and solve the above-described problems and other problems related to automatic neutral point of view content generation.

An embodiment can be implemented as a software application. The application implementing an embodiment can be configured as a modification of an existing content generation or content management system, as a separate application that operates in conjunction with an existing content generation or content management system, a standalone application, or some combination thereof.

Particularly, some illustrative embodiments provide a method that constructs a structured representation of topics or concepts expressed in a set of natural language documents, scores a polarity of a subset of the documents, adds additional documents to the subset to result in a polarity score within a predefined neutral polarity score range, removes sentences having a factuality score below a threshold from the results, and uses the results to generate new, factual content with a neutral point of view.

An embodiment receives, as input, a set of content. The content includes natural language text documents, structured representations of natural language text, or a combination. Some non-limiting examples of natural language text documents include books, articles, electronic mail messages, text messages, and social media messages, as well as textual representations of audio or video.

An embodiment extracts concepts expressed in documents in the set of content, and constructs a concept tree representing the set of content. A concept tree has a tree structure, which represents the hierarchical nature of a structure in a graphical form, with a root node having a value linked to subtrees of child nodes, each with their own values. A parent node of a child node is a node one level higher in the tree than the child node. Thus, if a root node includes a set of child nodes, each child node's parent node is the root node. Within the concept tree, each node represents a concept, or subject, of a subset of the set of documents, and thus holds documents expressing that concept. The tree's root node represents the most general version of a concept, and each successive level of the tree represents an increasing level of specificity of the concept. The concept tree need not be a binary tree (i.e. each node need not have precisely two child nodes), and need not have any particular number of levels or symmetry.

Thus, for example, for a set of content about the sport of tennis, the root node might represent documents generally about tennis. A child node of the root node might represent documents about tennis players, and child nodes of that node might each represent documents about a specific tennis player. Another child node of the root node might represent documents about tennis techniques, and child nodes of that node might each represent documents about specific tennis techniques. Another child node of the root node might represent documents about tennis playing strategies, and child nodes of that node might each represent documents about specific tennis strategies for use in particular game situations.

To extract concepts from a natural language text document, one embodiment uses a presently known extractive summarization technique to extract one or more principal, or important, sentences from the document. A principal sentence is a grouping of words expressing a concept and need not be a grammatically correct sentence in any particular language. The embodiment determines the concepts expressed in the principal sentences discovered through extractive summarization. The embodiment also determines the specificity of the concepts by applying word embedding similarities against hierarchical concepts. Based on the concepts and their specificity, the embodiment assigns the document to a corresponding level and node in the complexity tree. In one embodiment, the most specific level in the concept tree is the level at which a more specific concept can no longer be extracted. In another embodiment, the most specific level in the concept tree is the level at which the document contains at least a particular number of principal sentences, for example four principal sentences.

Thus, continuing the tennis example, a document reporting the results of the most recent major tennis tournament might include mentions of Player A, who won the tournament, Player B, who lost in the final round to Player A, and Player C, a new player who unexpectedly reached the semi-final round. Because the document does not include much detail about each player, the document is assigned to the node representing documents about tennis players generally. However, a detailed profile of Player C, including an interview, biographical detail, and an assessment of her prospects for advancing in the sport, does have sufficient detail about Player C to be assigned to a node representing documents about Player C instead of the node representing documents about tennis players generally.

An embodiment scores a polarity of a subset of natural language text documents represented by a node in the concept tree. To score polarity of a document in the set of content, one embodiment uses a trained polarity scoring model. The model takes two inputs: a sentence (or other word grouping) and a motion or proposition. The model classifies the sentence according to whether or not the sentence supports the motion. For example, given a motion that the two-handed backhand (a tennis technique) is good, a sentence such as, "The two-handed backhand is great!" supports the motion, and a sentence such as, "The two-handed backhand is hard to execute" does not support the motion. In one embodiment, the model output ranges from 1 (when the sentence fully supports the motion) to −1 (when the sentence does not support the motion), with 0 as a neutral value. In one embodiment, the model also outputs a confidence level in the classification, for example in a range between 0 and 1 or a percentage value between 0 and 100 percent. During training, the polarity scoring model learns to classify sentences based on motions using a set of labelled training data. The set of labelled training data includes pairs of sentences and motions, along with a polarity label denoting whether the sentence supports or does not support the motion.

Thus, to score a polarity of a subset of natural language text documents represented by a node in the concept tree, one embodiment uses, as the motion, a search string that generated the set of content the embodiment is analyzing. Another embodiment uses, as the motion, the node's concept. Another embodiment uses, as the motion, a motion stored in a user's profile.

One embodiment scores a document's polarity by averaging the polarities of each principal sentence of the document with respect to the same motion. Another embodiment scores a document's polarity by averaging the polarities of each sentence of the document with respect to the same motion. Another embodiment scores a document's polarity by generating a summary of the document, and scoring the polarity of that summary. An embodiment scores a polarity of a set of natural language text documents by averaging polarities of documents in the set. Another embodiment removes a polarity score for a sentence, principal sentence, summary, or document with a polarity scoring confidence value under a threshold value from a set of polarity scores before averaging the remainder of the set of polarity scores.

An embodiment adds a second set of natural language text documents to a node's documents. The embodiment selects the second set of documents so that the combined set of documents has a neutral polarity. To obtain the second set of documents, one embodiment generates a search term that is the opposite of the motion used to determine the initial polarity score. For example, if the initial motion was that the two-handed backhand is good, a generated search term might be that the two-handed backhand is bad.

The embodiment uses the generated search term to obtain a collection of documents from a document repository. The embodiment measures the combined polarity of previously-measured and newly-obtained documents using the original motion. If the combined polarity is now within a predefined neutral polarity range, the embodiment stops. Otherwise, the embodiment repeats the searching and polarity measurement until the resulting combined polarity is within the neutral polarity range. Continuing the tennis example, if the initial motion was that the two-handed backhand is good, and the new search term was that the two-handed backhand is bad, the resulting set of documents represented by that node now includes a mixture of points of view on the two-handed backhand, resulting in overall neutral point of view.

An embodiment assembles a bin. A bin is a set of sentences from documents corresponding to a node of the concept tree. As part of bin assembly, the embodiment stores data relating each sentence in the bin to its source document. In one embodiment, the sentences are principal sentences extracted using an extractive summarization technique. In another embodiment, the sentences need not be principal sentences, and comprise any sentence or other set of words from a document. An embodiment selects sentences from documents originally classified into the node as well as documents added to the node's documents to create a neutral polarity set of sentences. To generate an expanded range of concepts, one embodiment selects sentences from documents represented by the node's parent node and from at least one of the node's child nodes, if they exist, as well as from the node's documents.

Sentence selection parameters are configurable to obtain desired results. Since new content will be generated from the sentences within a bin, each bin should include enough sentences, from diverse points of view, from which to source desired information, while avoiding the inclusion of redundant information. For example, several different sentences, each discussing different properties of the two-handed backhand in tennis, might be useful sources in synthesizing new content about the two-handed backhand. On the other hand, several different sentences, each extolling the greatness of Player A, are likely redundant and only one should be included in a bin. Thus, one non-limiting example of a sentence selection parameter is the number of sentences to be included in a bin. Another non-limiting example of a sentence selection parameter is a minimum quality score, as measured by a presently available document quality assessment tool, for a selected sentence.

Another non-limiting example of a sentence selection parameter is a polarity measurement of a sentence. If the new content to be generated is a broad topic summary, polarity differences among textual units included in a bin should be maximized while including at least one textual unit representing each point of view, as determined by a polarity range. On the other hand, if the new content to be generated is a summary of a particular point of view, polarity differences among included textual units should be minimized.

An embodiments generates a set of textual variants of a sentence within a bin. To generate textual variants, one embodiment uses a Text-To-Text Transfer Transformer (T5) model, which is trained to generate text from input text. To generate textual variants, another embodiment uses another presently-available technique. In a textual variant of a sentence, synonyms for one or more words or phrases in the sentence replace the original words or phrases, and the sentence is optionally restructured from its original form. For example, two textual variants of "harder to execute" are "more difficult to execute" and "more complicated to execute".

An embodiment generates a structured representation of a sentence within a document within a bin, as well as structured representation of each textual variant of the sentence. One embodiment uses a trained deep learning model to generate structured variations of sentences. From each structured representation, the embodiment generates a data retrieval statement, for use as a search term within a known-accurate repository of factual information. In one embodiment, the data retrieval statement is in structured query language (SQL), and the repository is a database that can be queried using a search term in SQL form. Another embodiment generates a data retrieval statement directly from a sentence within a document within a bin and a textual variant of the sentence, without generating a structured representation.

An embodiment uses the results of the searches to score the factuality of a sentence and of its variants. In particular, an embodiment makes a binary (one for yes, zero for no) decision as to whether a search aligns factually with the factual information in the repository. The embodiment averages together the factuality scores of a sentence and its variants and uses the result as a factuality score of the sentence. In addition, the embodiment is configurable to generate a factuality score of a document, and include the document's factuality score as a user-adjustable contribution to sentence scores of sentences of that document. An embodiment removes a sentence having a factuality score below a threshold factuality score from the bin, resulting in a filtered bin. The filtered bin now includes a set of sufficiently factual sentences with an overall neutral point of view, usable to generate new content that is also sufficiently factual and neutral.

For example, an embodiment might generate a structured representation of a sentence reporting dates of a recently-concluded tennis tournaments, generate textual variants of the sentence, generate a structured representation of the sentence and structured representation of each textual variant of the sentence, and uses tournament dates, within the structured representations to search for comparable information in an known-accurate compendium of factual tennis information to determine whether the document's dates are correct. Based on the results, the embodiment removes a sentence having a factuality score below a threshold factuality score, for example sentences reporting incorrect dates for the tournament, from the bin, resulting in a filtered bin.

An embodiment removes a filtered bin that includes less than a threshold number of documents, portions of documents (e.g. sentences), facts (expressed as documents, a portion of a document, or a structured representation), or another measure of the amount of content within a filtered bin. For example, one embodiment removes a filtered bin that includes less than four facts. Filtered bins containing less than a threshold amount of content contain too little content from which to generate new content with a specificity appropriate to the corresponding node's placement within the concept tree.

An embodiment generates, from sentences in the filtered bin, a structured description of the contents of the filtered bin. Techniques to generate a structured description of a set of documents are presently available.

An embodiment generates a new natural language text document corresponding to the filtered bin of sentences. One embodiment uses a transformer deep learning narration generation model to generate the new document directly from the sentences in the filtered bin. Another embodiment uses the structured description of the contents of the filtered bin to generate the new document. As a result, by starting with nodes at different levels of the concept tree, an embodiment generates bins and corresponding new content at different levels of conceptual specificity. In addition, an embodiment generates either a broad topic summary or a summary of a particular point of view by maximizing or minimizing polarity differences between items within a particular bin.

The manner of automatic neutral point of view content generation described herein is unavailable in the presently available methods in the technological field of endeavor pertaining to content generation. A method of an embodiment described herein, when implemented to execute on a device or data processing system, comprises substantial advancement of the functionality of that device or data processing system in constructing a structured representation of topics or concepts expressed in a set of natural language documents, scoring a polarity of a subset of the documents, adding additional documents to the subset to result in a polarity score within a predefined neutral polarity score range, removing sentences having a factuality score below a threshold from the results, and using the results to generate new, factual content with a neutral point of view.

The illustrative embodiments are described with respect to certain types of concept trees, contents, documents, sentences, representations, statements, motions, models, thresholds, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
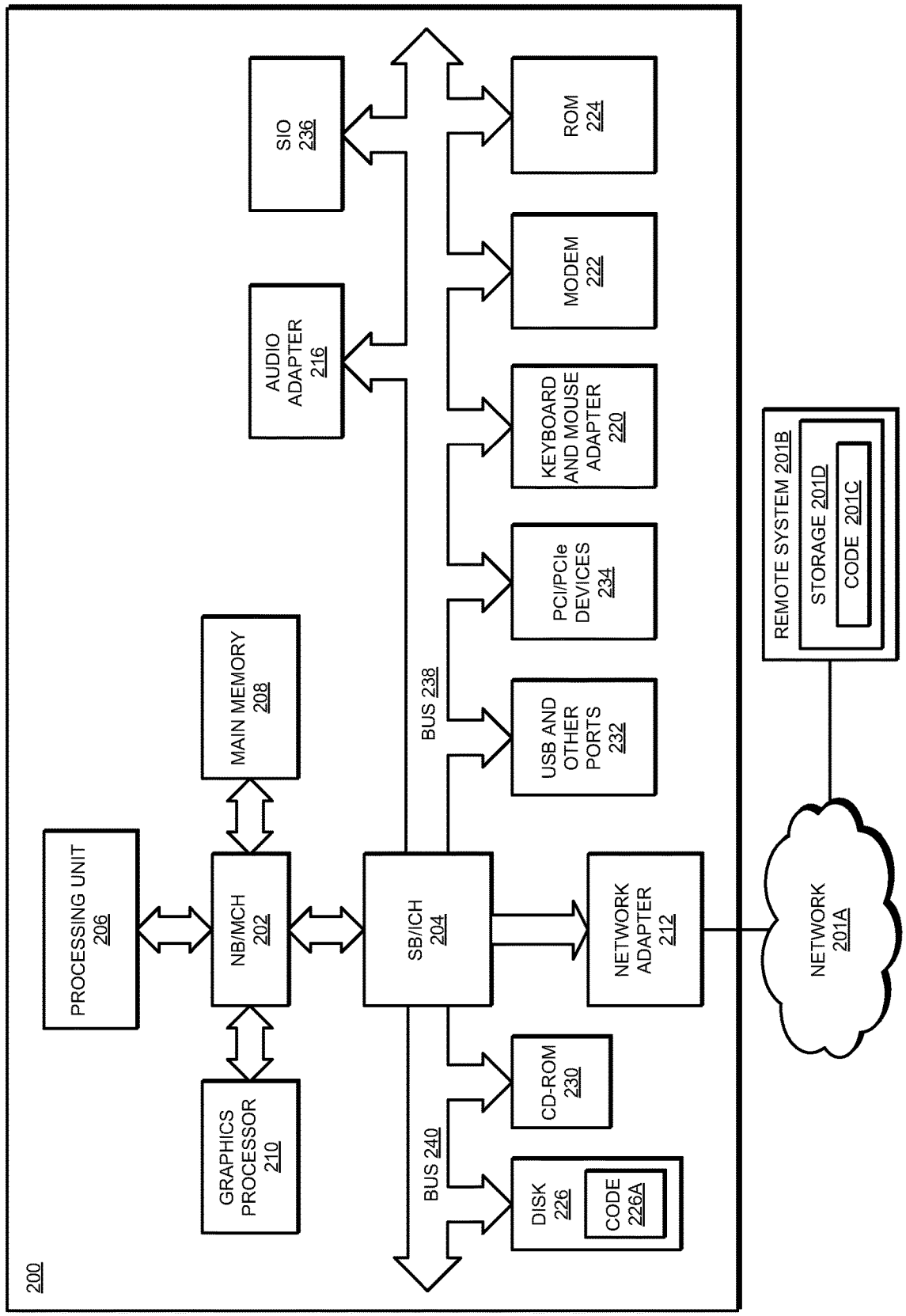
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
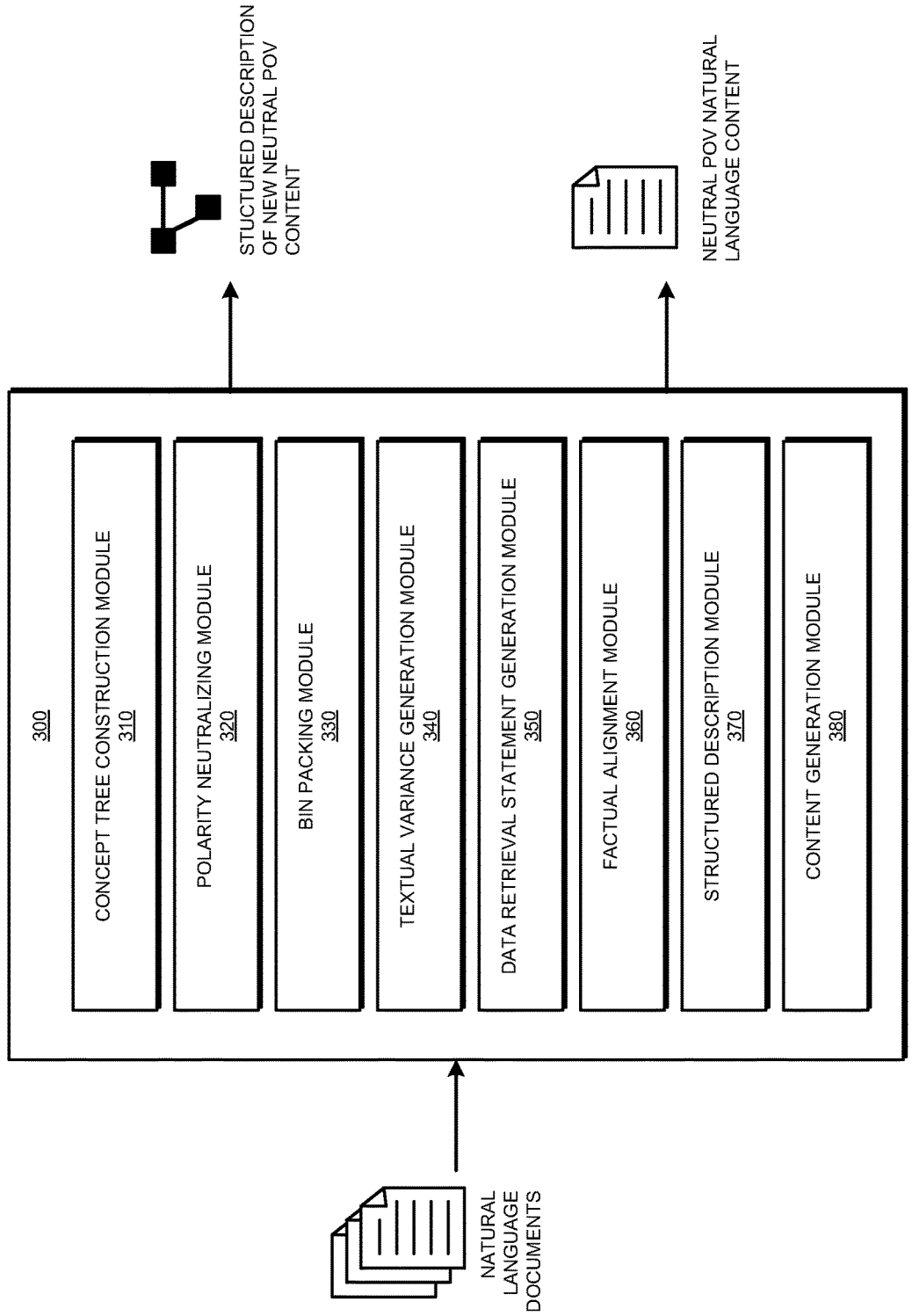
FIG. 3 depicts a block diagram of an example configuration for automatic neutral point of view content generation in accordance with an illustrative embodiment.

With reference to FIG. 3, this figure depicts a block diagram of an example configuration for automatic neutral point of view content generation in accordance with an illustrative embodiment. Application 300 is an example of application 105 in FIG. 1 and executes in any of servers 104 and 106, clients 110, 112, and 114, and device 132 in FIG. 1.

Application 300 receives, as input, a set of content. The content includes natural language text documents, structured representations of natural language text, or a combination.

Concept tree construction module 310 extracts concepts expressed in documents in the set of content, and constructs a concept tree representing the set of content. Within the concept tree, each node represents a concept, or subject, of a subset of the set of documents, and thus holds documents expressing that concept. The tree's root node represents the most general version of a concept, and each successive level of the tree represents an increasing level of specificity of the concept. The concept tree need not be a binary tree (i.e. each node need not have precisely two child nodes), and need not have any particular number of levels or symmetry.

To extract concepts from a natural language text document, module 310 uses a presently known extractive summarization technique to extract one or more principal, or important, sentences from the document. Module 310 determines the concepts expressed in the principal sentences discovered through extractive summarization. Module 310 also determines the specificity of the concepts by applying word embedding similarities against hierarchical concepts. Based on the concepts and their specificity, module 310 assigns the document to a corresponding level and node in the complexity tree. In one implementation of module 310, the most specific level in the concept tree is the level at which a more specific concept can no longer be extracted. In another implementation of module 310, the most specific level in the concept tree is the level at which the document contains at least a particular number of principal sentences, for example four principal sentences.

Polarity neutralizing module 320 scores a polarity of a subset of natural language text documents represented by a node in the concept tree. To score polarity of a document in the set of content, module 320 uses a trained polarity scoring model. The model takes two inputs: a sentence (or other word grouping) and a motion or proposition. The model classifies the sentence according to whether or not the sentence supports the motion. In one implementation of module 320, the model output is 1 when the sentence supports the motion, −1 when the sentence does not support the motion. In one implementation of module 320, the model also outputs a confidence level in the classification, for example in a range between 0 and 1 or a percentage value between 0 and 100 percent. During training, the polarity scoring model learns to classify sentences based on motions using a set of labelled training data. The set of labelled training data includes pairs of sentences and motions, along with a polarity label denoting whether the sentence supports or does not support the motion. Thus, to score a polarity of a subset of natural language text documents represented by a node in the concept tree, one implementation of module 320 uses, as the motion, a search string that generated the set of content the embodiment is analyzing. Another implementation of module 320 uses, as the motion, the node's concept. Another implementation of module 320 uses, as the motion, a motion stored in a user's profile.

One implementation of module 320 scores a document's polarity by averaging the polarities of each principal sentence of the document with respect to the same motion. Another implementation of module 320 scores a document's polarity by averaging the polarities of each sentence of the document with respect to the same motion. Another implementation of module 320 scores a document's polarity by generating a summary of the document, and scoring the polarity of that summary. One implementation of module 320 scores a polarity of a set of natural language text documents by averaging polarities of documents in the set. Another implementation of module 320 removes a polarity score for a sentence, principal sentence, summary, or document with a polarity scoring confidence value under a threshold value from a set of polarity scores before averaging the remainder of the set of polarity scores.

Module 320 adds a second set of natural language text documents to a node's documents. Module 320 selects the second set of documents so that the combined set of documents has a neutral polarity. To obtain the second set of documents, module 320 generates a search term that is the opposite of the motion used to determine the initial polarity score.

Module 320 uses the generated search term to obtain a collection of documents from a document repository. Module 320 measures the combined polarity of previously-measured and newly-obtained documents using the original motion. If the combined polarity is now within a predefined neutral polarity range, module 320 stops. Otherwise, module 320 repeats the searching and polarity measurement until the resulting combined polarity is within the neutral polarity range.

Bin packing module 330 assembles a bin of sentences from documents corresponding to a node of the concept tree. In one implementation of module 330, the sentences are principal sentences extracted using an extractive summarization technique. In another implementation of module 330, the sentences need not be principal sentences, and comprise any sentence or other set of words from a document. Module 330 selects from documents originally classified into the node as well as documents added to the node's documents to create a neutral polarity set of sentences. To generate an expanded range of concepts, module 330 selects sentences from documents from the node's parent node and from at least one of the node's child nodes, if they exist, as well as from the node's documents.

Sentence selection parameters are configurable to obtain desired results. Since new content will be generated from the sentences within a bin, each bin should include enough sentences, from diverse points of view, from which to source desired information, while avoiding the inclusion of redundant information. For example, several different sentences, each discussing different properties of the two-handed backhand in tennis, might be useful sources in synthesizing new content about the two-handed backhand. On the other hand, several different sentences, each extolling the greatness of Player A, are likely redundant and only one should be included in a bin. Thus, one non-limiting example of a sentence selection parameter is the number of sentences to be included in a bin. Another non-limiting example of a sentence selection parameter is a minimum quality score, as measured by a presently available document quality assessment tool, for a selected sentence. Another non-limiting example of a sentence selection parameter is a polarity measurement of a sentence. If the new content to be generated is a broad topic summary, polarity differences among textual units included in a bin should be maximized while including at least one textual unit representing each point of view, as determined by a polarity range. On the other hand, if the new content to be generated is a summary of a particular point of view, polarity differences among included textual units should be minimized.

Textual variance generation module 340 generates a set of textual variants of a sentence within a document within a bin. To generate textual variants, implementations of module 340 use a Text-To-Text Transfer Transformer (T5) model or another presently-available technique. Application 300 uses a trained deep learning model to generate a structured representation of a sentence within a document within a bin, as well as structured representation of each textual variant of the sentence.

From each structured representation, data retrieval statement generation module 350 generates a data retrieval statement, for use as a search term within a known-accurate repository of factual information. In one implementation of module 350, the data retrieval statement is in structured query language (SQL), and the repository is a database that can be queried using a search term in SQL form. Another implementation of module 350 generates a data retrieval statement directly from a sentence within a document within a bin and a textual variant of the sentence, bypassing a structured representation.

Factual alignment module 360 uses the results of the searches to score the factuality of a sentence and of its variants. In particular, module 360 makes a binary (one for yes, zero for no) decision as to whether a search aligns factually with the factual information in the repository. Module 360 averages together the factuality scores of a sentence and its variants and uses the result as a factuality score of the sentence. In addition, module 360 is configurable to generate a factuality score of a document, and include the document's factuality score as a user-adjustable contribution to sentence scores of sentences of that document. An embodiment removes a sentence having a factuality score below a threshold factuality score from the bin, resulting in a filtered bin. The filtered bin now includes a set of sufficiently factual sentences with an overall neutral point of view, usable to generate new content that is also sufficiently factual and neutral.

Application 300 removes a filtered bin that includes less than a threshold number of documents, portions of documents (e.g. sentences), facts (expressed as documents, a portion of a document, or a structured representation), or another measure of the amount of content within a filtered bin. For example, one implementation of application 300 removes a filtered bin that includes less than four facts. Filtered bins containing less than a threshold amount of content contain too little content from which to generate new content with a specificity appropriate to the corresponding node's placement within the concept tree.

Structured description module 370 generates, from sentences in the filtered bin, a structured description of the contents of the filtered bin. Techniques to generate a structured description of a set of documents are presently available.

Content generation module 380 generates a new natural language text document corresponding to the filtered bin of sentences. One implementation of module 380 uses a transformer deep learning narration generation model to generate the new document directly from the sentences in the filtered bin. Another implementation of module 380 uses the structured description of the contents of the filtered bin to generate the new document.

Figure 4:
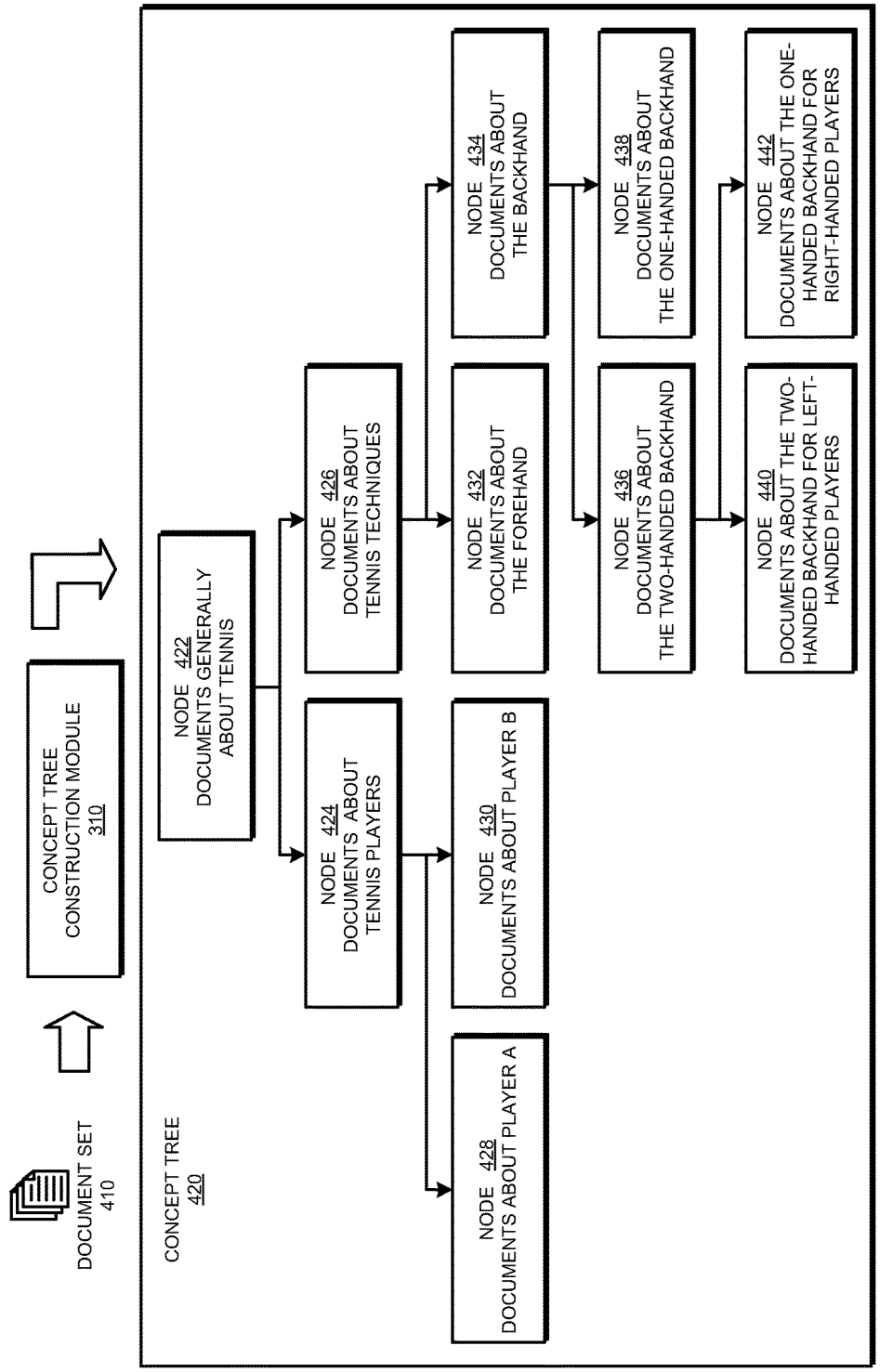
FIG. 4 depicts an example of automatic neutral point of view content generation in accordance with an illustrative embodiment.

With reference to FIG. 4, this figure depicts an example of automatic neutral point of view content generation in accordance with an illustrative embodiment. The example can be executed using application 300 in FIG. 3. Concept tree construction module 310 is the same as concept tree construction module 310 in FIG. 3.

Concept tree construction module 310 has extracted concepts expressed in documents in document set 410, and constructed concept tree 420. Within concept tree 420, each of nodes 422, 424, 426, 428, 430, 432, 434, 436, 438, 440, and 442 represents a concept, or subject, of a subset of document set 410, and thus holds documents expressing that concept. Thus, node 422—concept tree 420's root node—represents the most general version of a concept, documents generally about tennis. Each successive level of the tree represents an increasing level of specificity of different aspects of tennis. In particular, node 424 (a child node of node 422) represents documents about tennis players, and nodes 428 and 430 (child nodes of node 424) each represent documents about a specific tennis player. Node 426 (another child node of node 422) represents documents about tennis techniques, and nodes 432 and 434 (child nodes of node 426) each represent documents about specific tennis techniques. Nodes 440 and 442 (child nodes of node 436) each represent documents about different aspects of one specific tennis technique, the two-handed backhand.

Figure 5:
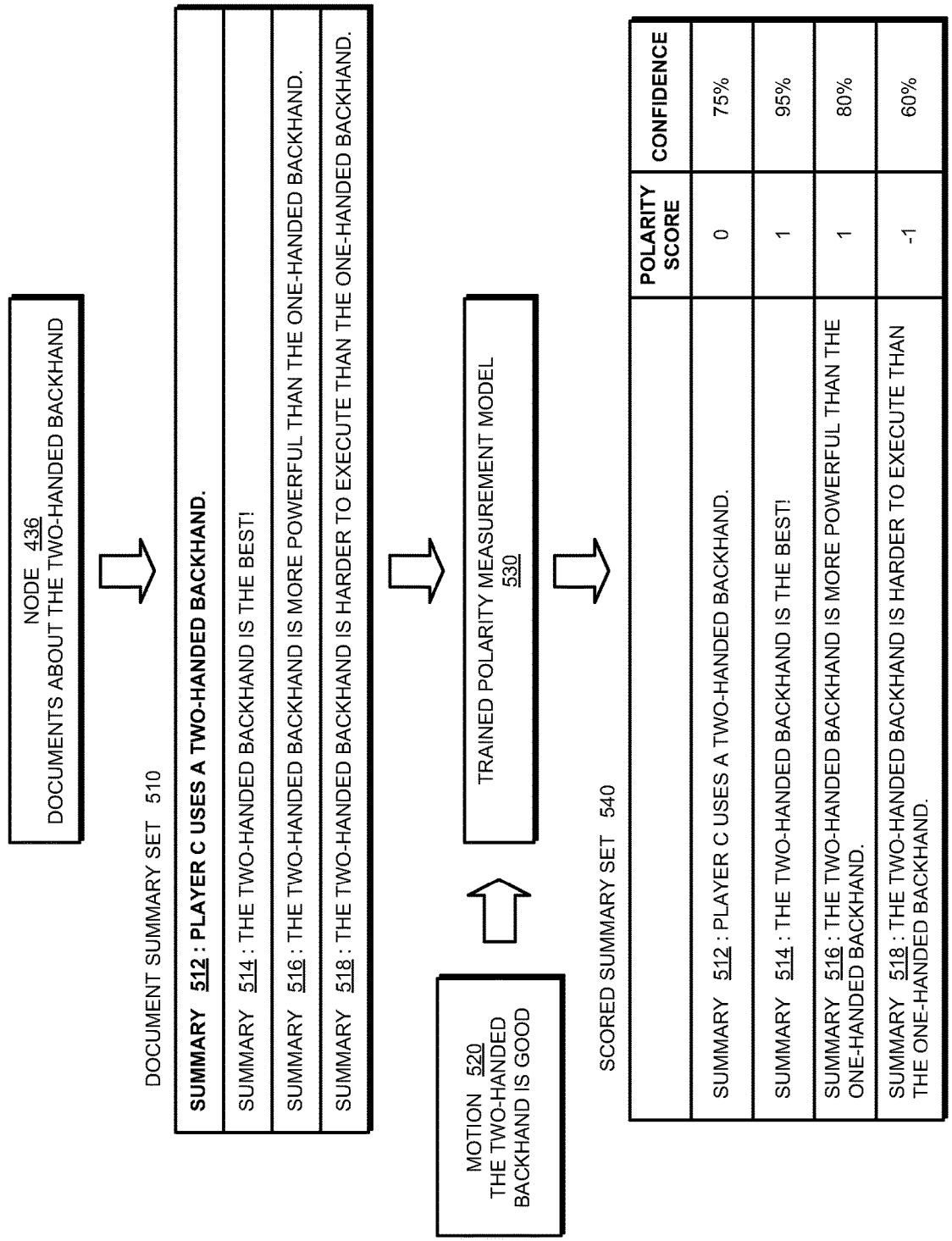
FIG. 5 depicts a continued example of automatic neutral point of view content generation in accordance with an illustrative embodiment.

With reference to FIG. 5, this figure depicts a continued example of automatic neutral point of view content generation in accordance with an illustrative embodiment. Node 436 is the same as node 436 in FIG. 4.

Document summary set 510 includes summaries 512, 514, 516, and 518, each a summary of a document represented by node 436. Trained polarity measurement model 530 scores the polarity, and generates a confidence for each polarity score, of each of summaries 512, 514, 516, and 518 against motion 520. The results are shown in scored summary set 540.

Figure 6:
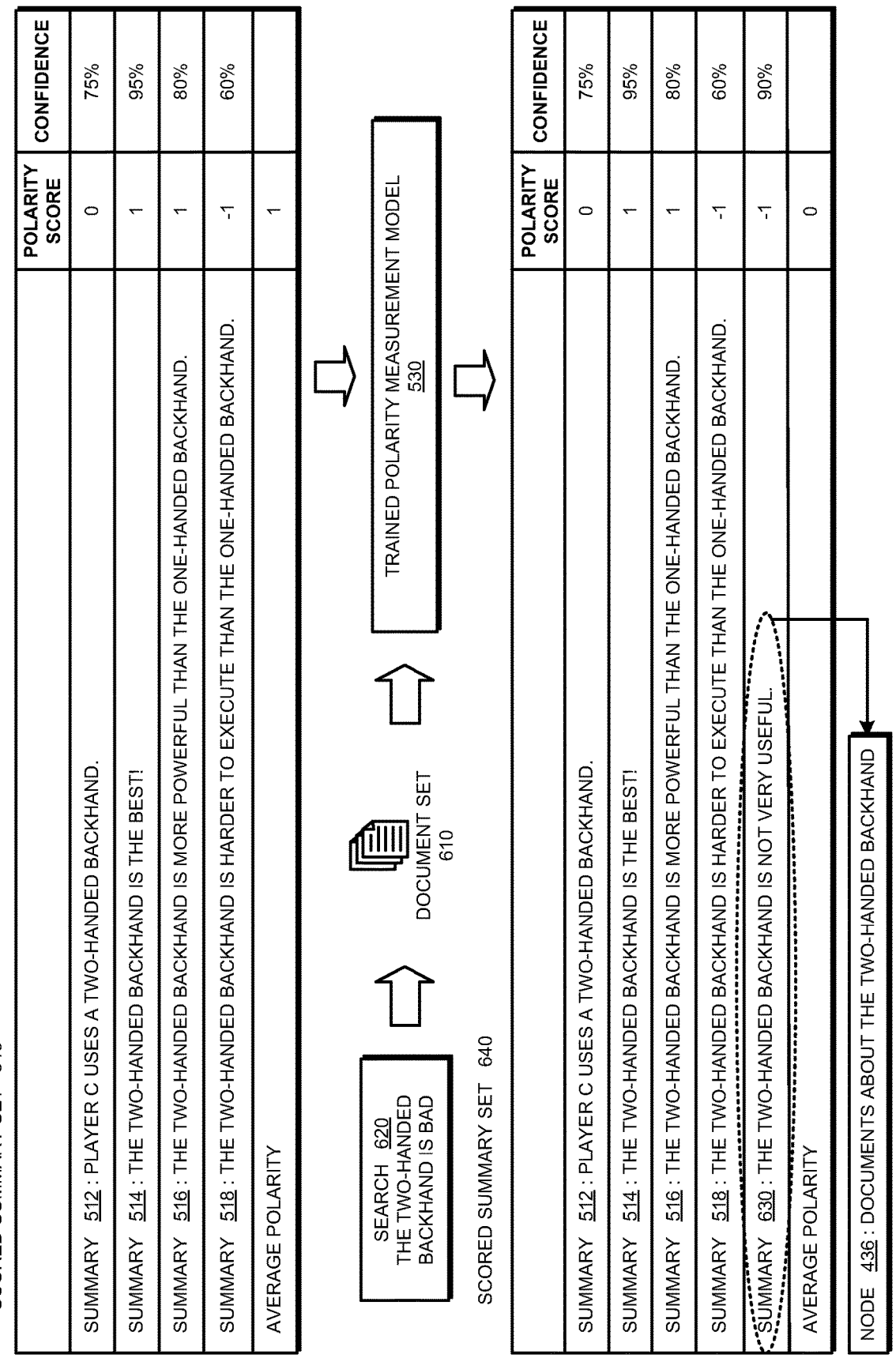
FIG. 6 depicts a continued example of automatic neutral point of view content generation in accordance with an illustrative embodiment.

With reference to FIG. 6, this figure depicts a continued example of automatic neutral point of view content generation in accordance with an illustrative embodiment. Node 436 is the same as node 436 in FIG. 4. Trained polarity measurement model 530, scored summary set 540 and summaries 512, 514, 516, and 518 are the same as trained polarity measurement model 530, scored summary set 540 and summaries 512, 514, 516, and 518 in FIG. 5.

Here, because the average polarity of scored summary set 540 is 1, outside the predefined neutral polarity range, application 300 generates search 620, the opposite of motion 520 used to determine the initial polarity score. Application 300 uses the generated search term to obtain document set 610 from a document repository, and uses trained polarity measurement model 530 to measure the combined polarity of previously-measured and newly-obtained documents, including summary 630, using original motion 520. The average polarity of scored summary set 640 is now 0, within the predefined neutral polarity range, and the parent document of summary 630 is added to the documents represented by node 436.

Figure 7:
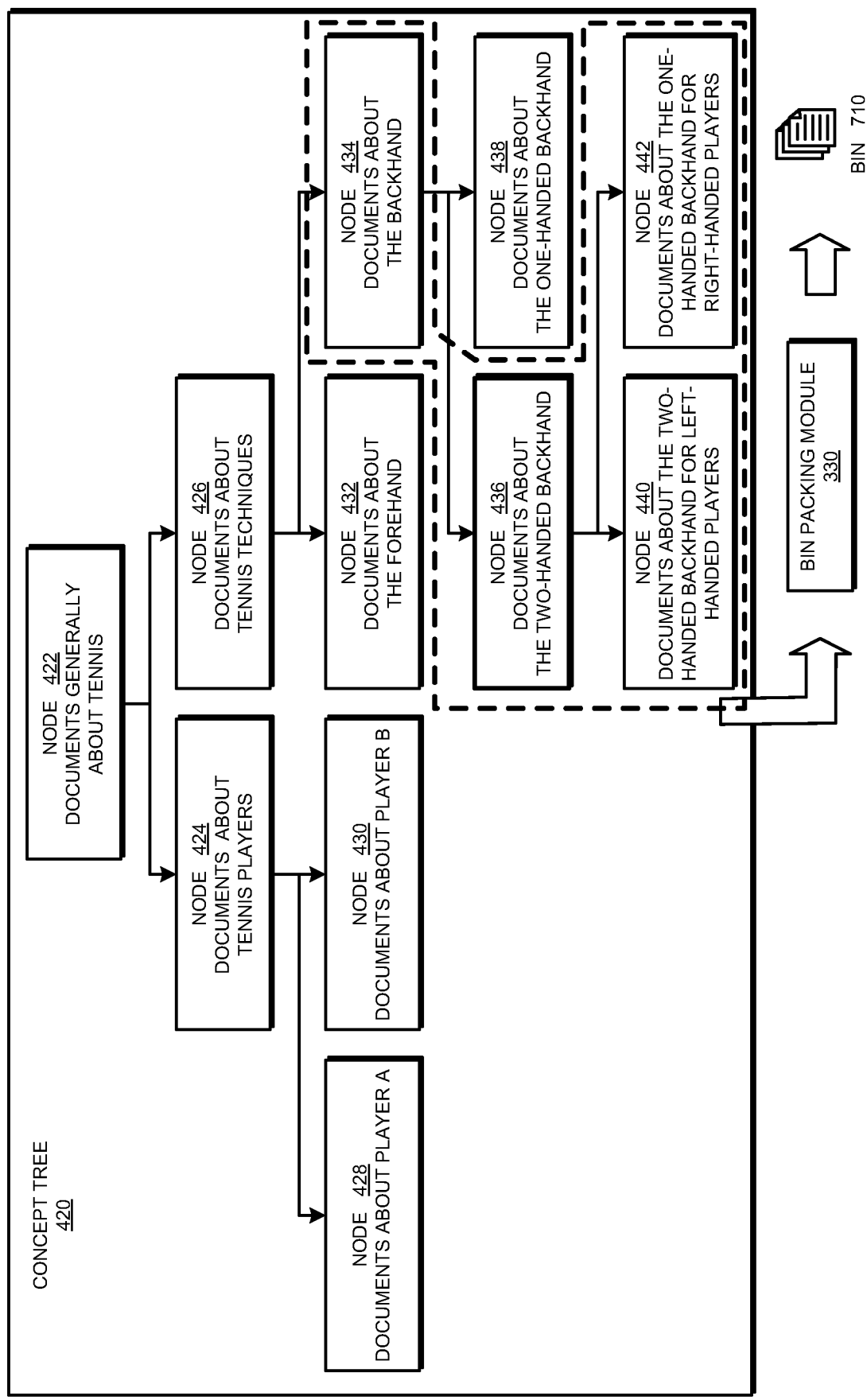
FIG. 7 depicts a continued example of automatic neutral point of view content generation in accordance with an illustrative embodiment.

With reference to FIG. 7, this figure depicts a continued example of automatic neutral point of view content generation in accordance with an illustrative embodiment. Bin packing module 330 is the same as bin packing module 330 in FIG. 3. Concept tree 420 and nodes 422, 424, 426, 428, 430, 432, 434, 436, 438, 440, and 442 are the same as concept tree 420 and nodes 422, 424, 426, 428, 430, 432, 434, 436, 438, 440, and 442 in FIG. 4.

As depicted, bin packing module 330 assembles bin 710 corresponding to node 436 of concept tree 420. To generate an expanded range of concepts, module 330 also selects documents from node 434 (node 426's parent node) and nodes 440 and 442 (node 426's child nodes), if they exist, as well as from the node's documents.

Figure 8:
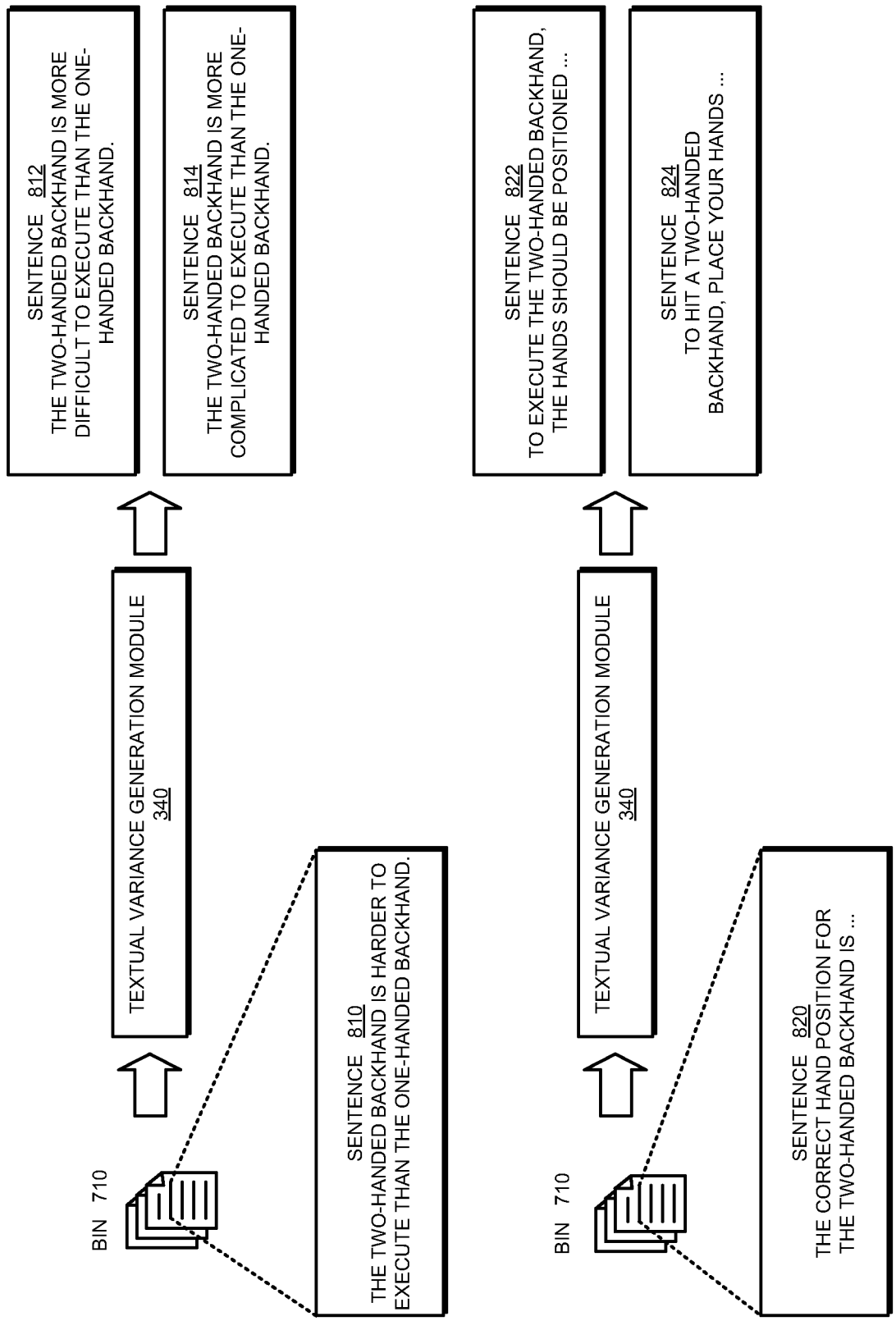
FIG. 8 depicts a continued example of automatic neutral point of view content generation in accordance with an illustrative embodiment.

With reference to FIG. 8, this figure depicts a continued example of automatic neutral point of view content generation in accordance with an illustrative embodiment. Textual variance generation module 340 is the same as textual variance generation module 340 in FIG. 3. Bin 710 is the same as bin 710 in FIG. 7.

Sentence 810 is a sentence within bin 710. From sentence 810, textual variance generation module 340 generates sentences 812 and 814, which are textual variants of sentence 810. Sentence 820 is another sentence within bin 710. From sentence 820, textual variance generation module 340 generates sentences 822 and 824, which are textual variants of sentence 820.

Figure 9:
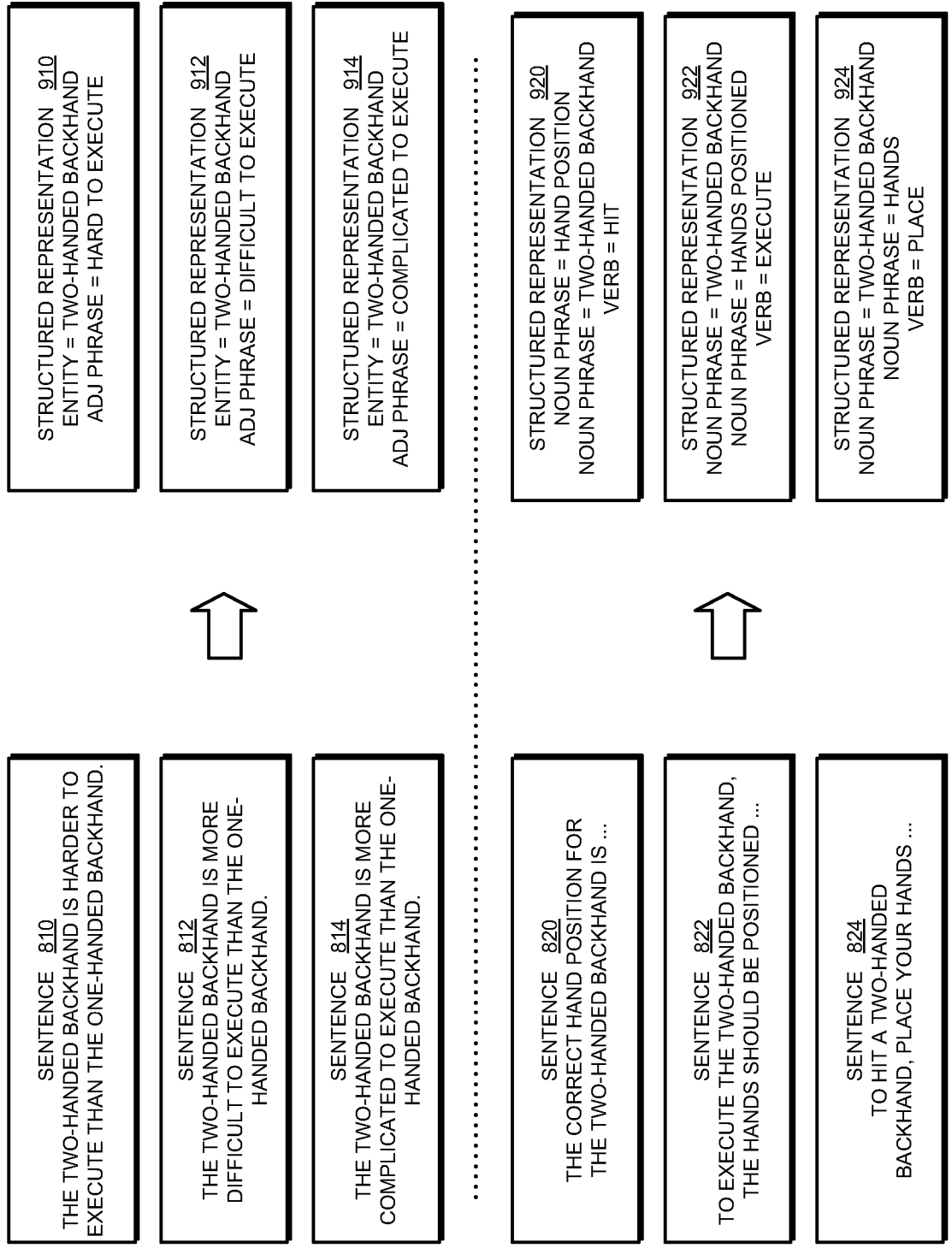
FIG. 9 depicts a continued example of automatic neutral point of view content generation in accordance with an illustrative embodiment.

With reference to FIG. 9, this figure depicts a continued example of automatic neutral point of view content generation in accordance with an illustrative embodiment. Sentences 810, 812, 814, 820, 822, and 824 are the same as sentences 810, 812, 814, 820, 822, and 824 in FIG. 8.

Structured representations 910, 912, 914, 920, 922, and 924 are structured representations of sentences 810, 812, 814, 820, 822, and 824 respectively.

Figure 10:
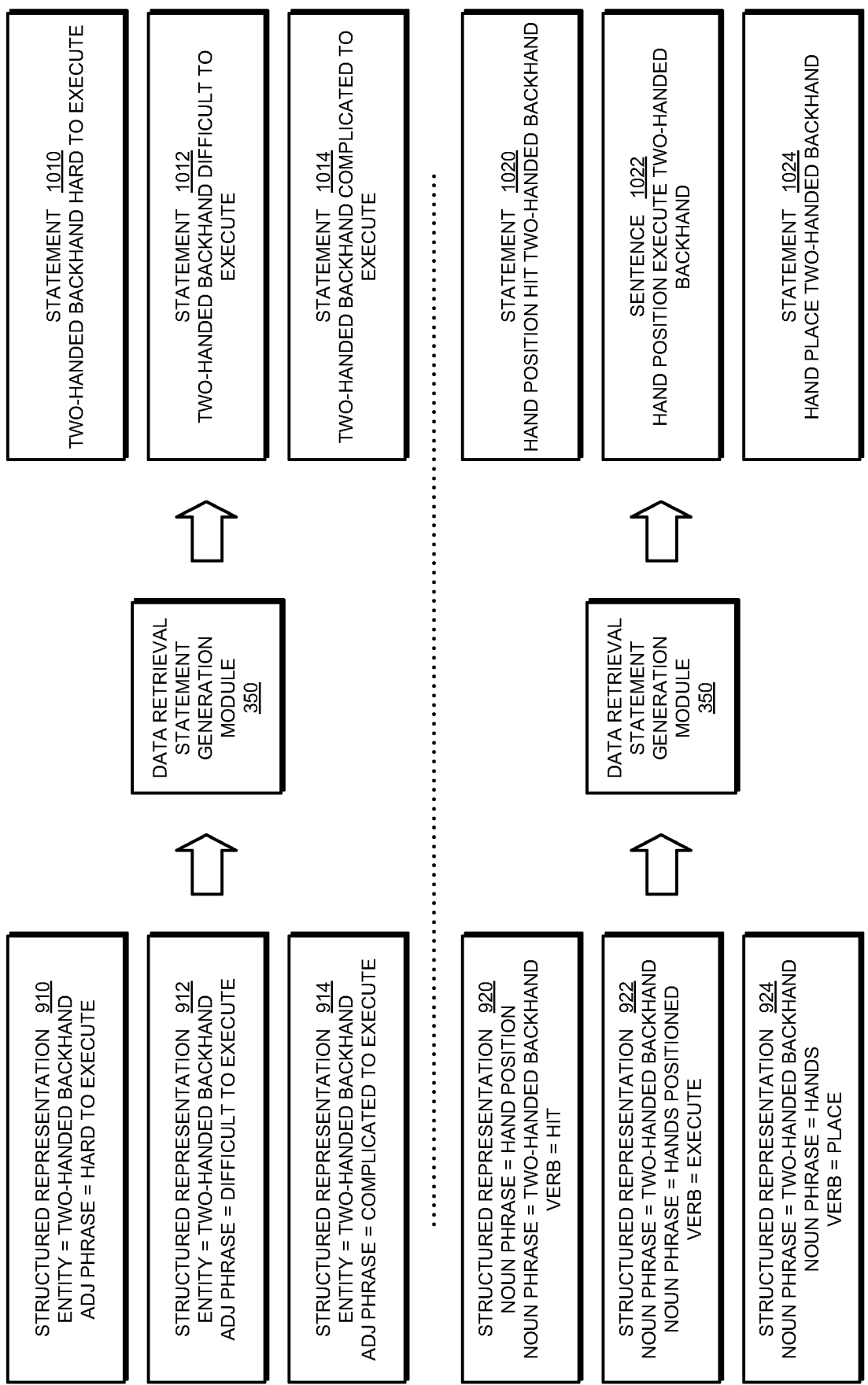
FIG. 10 depicts a continued example of automatic neutral point of view content generation in accordance with an illustrative embodiment.

With reference to FIG. 10, this figure depicts a continued example of automatic neutral point of view content generation in accordance with an illustrative embodiment. Data retrieval statement generation module 350 is the same as data retrieval statement generation module 350 in FIG. 3. Structured representations 910, 912, 914, 920, 922, and 924 are the same as structured representations 910, 912, 914, 920, 922, and 924 in FIG. 9.

From each of structured representations 910, 912, 914, 920, 922, and 924, data retrieval statement generation module 350 generates data retrieval statements 1010, 1012, 1014, 1020, 1022, and 1024 respectively, each for use as a search term within a known-accurate repository of factual information.

Figure 11:
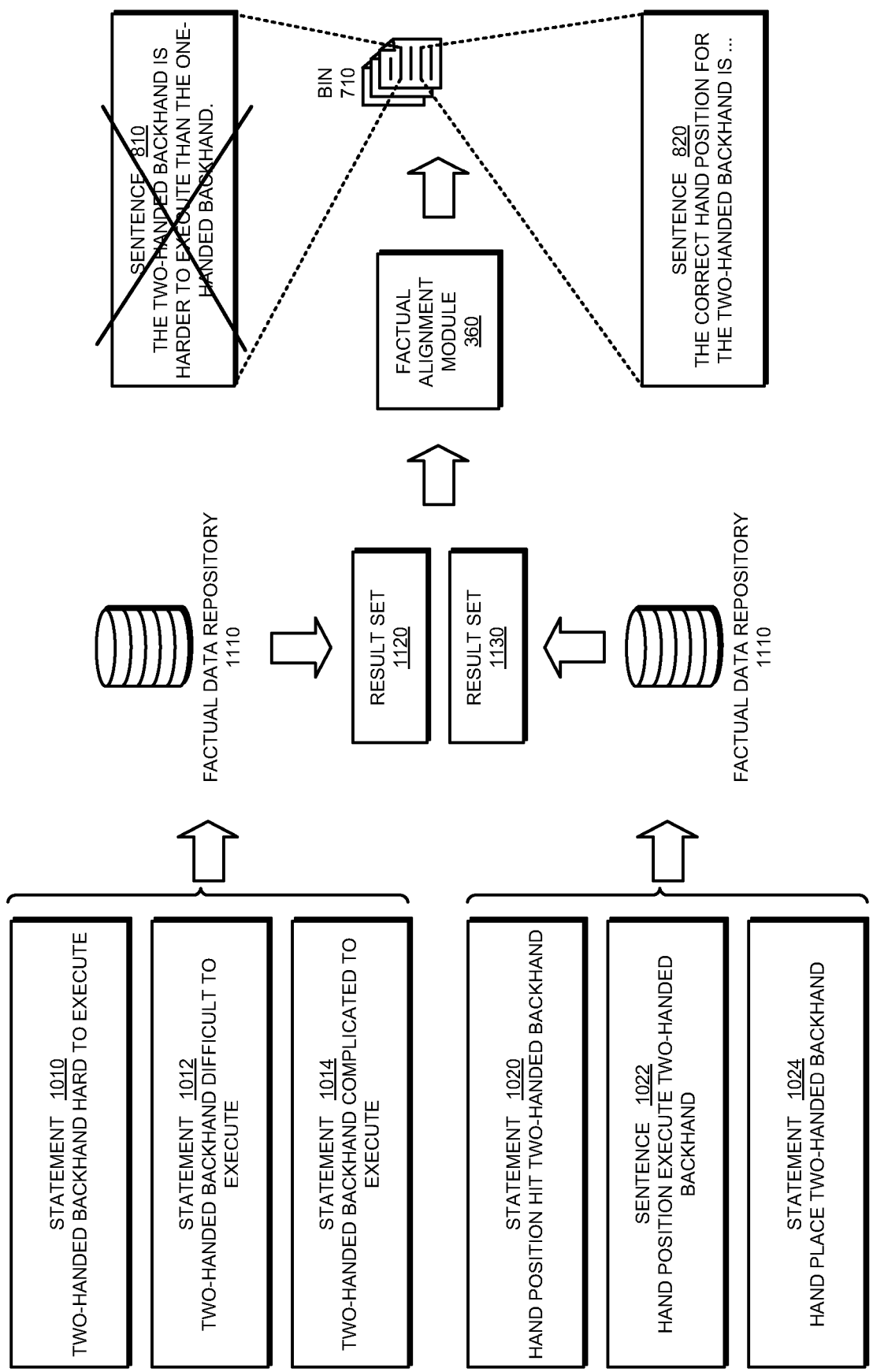
FIG. 11 depicts a continued example of automatic neutral point of view content generation in accordance with an illustrative embodiment.

With reference to FIG. 11, this figure depicts a continued example of automatic neutral point of view content generation in accordance with an illustrative embodiment. Factual alignment module 360 is the same as factual alignment module 360 in FIG. 3. Bin 710 is the same as bin 710 in FIG. 7. Sentences 810 and 820 are the same as sentences 810 and 820 in FIG. 8. Statements 1010, 1012, 1014, 1020, 1022, and 1024 are the same as statements 1010, 1012, 1014, 1020, 1022, and 1024 in FIG. 10.

Statements 1010, 1012, and 1014 are used as search terms within factual data repository 1110, generating result set 1120. Factual alignment module 360 uses result set 1120 to score the factuality of sentence 810 and of its variants. As a result, module 360 determines that sentence 810 does not aligns factually with the factual information in repository 1110, and sentence 810 is removed from bin 710.

Statements 1020, 1022, and 1024 are used as search terms within factual data repository 1110, generating result set 1130. Factual alignment module 360 uses result set 1130 to score the factuality of sentence 820 and of its variants. As a result, module 360 determines that sentence 820 does align factually with the factual information in repository 1110, and sentence 820 remains in bin 710.

Figure 12:
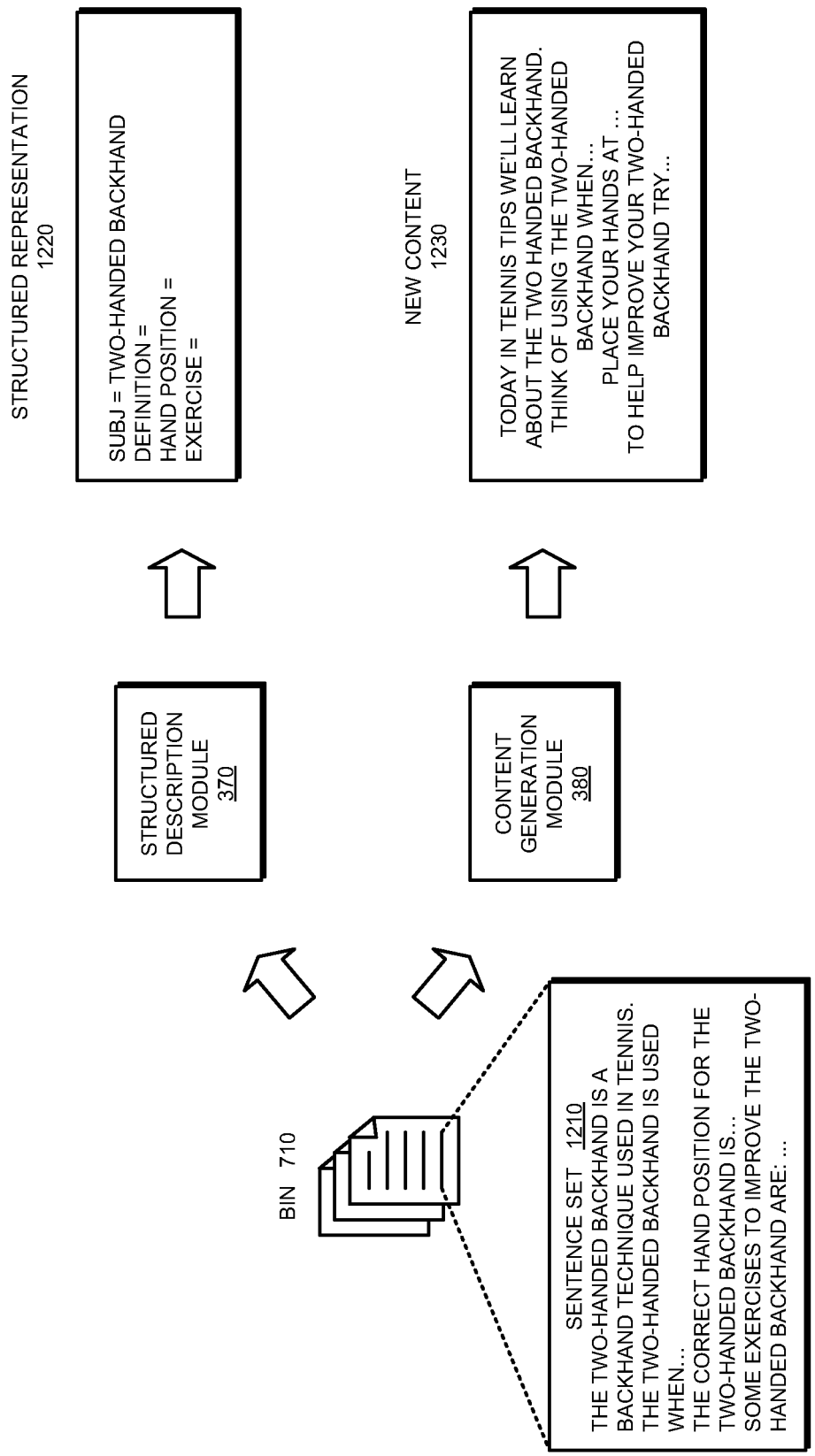
FIG. 12 depicts a continued example of automatic neutral point of view content generation in accordance with an illustrative embodiment.

With reference to FIG. 12, this figure depicts a continued example of automatic neutral point of view content generation in accordance with an illustrative embodiment. Structured description module 370 and content generation module 380 are the same as structured description module 370 and content generation module 380 in FIG. 3. Bin 710 is the same as bin 710 in FIG. 7.

Structured description module 370 uses sentence set 1210, part of bin 710, to generate structured representation 1220. Content generation module 380 uses sentence set 1210, part of bin 710, to generate new content 1230.

Figure 13:
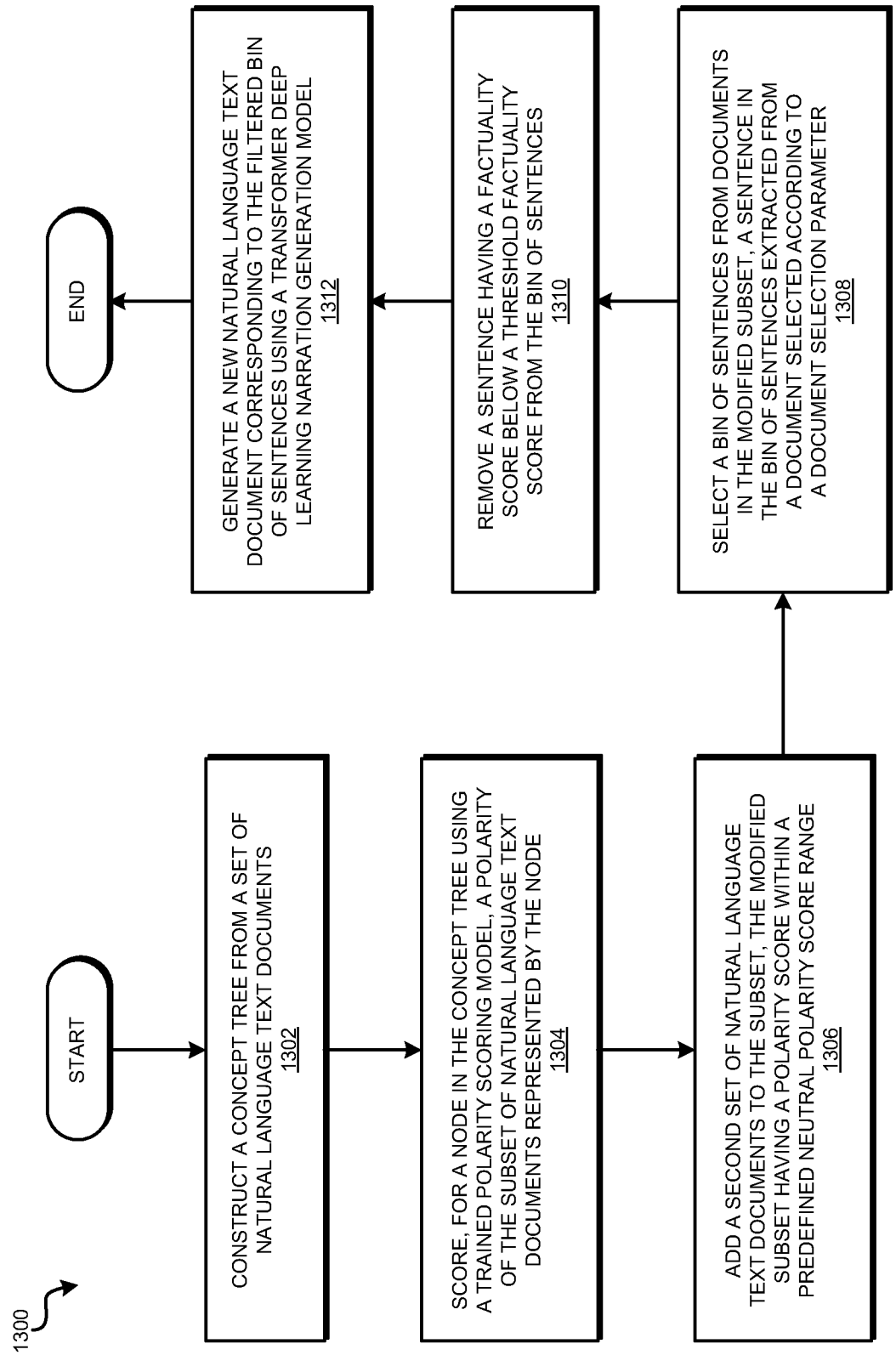
FIG. 13 depicts a flowchart of an example process for automatic neutral point of view content generation in accordance with an illustrative embodiment.

With reference to FIG. 13, this figure depicts a flowchart of an example process for automatic neutral point of view content generation in accordance with an illustrative embodiment. Process 1300 can be implemented in application 300 in FIG. 3.

In block 1302, the application constructs a concept tree from a set of natural language text documents. In block 1304, the application scores, for a node in the concept tree using a trained polarity scoring model, a polarity of the subset of natural language text documents represented by the node. In block 1306, the application adds a second set of natural language text documents to the subset, the modified subset having a polarity score within a predefined neutral polarity score range. In block 1308, the application selects a bin of sentences from documents in the modified subset, a sentence in the bin of sentences extracted from a document selected according to a sentence selection parameter. In block 1310, the application removes a sentence having a factuality score below a threshold factuality score from the bin of sentences. In block 1312, the application generates a new natural language text document corresponding to the filtered bin of sentences using a transformer deep learning narration generation model. Then the application ends.

Figure 14:
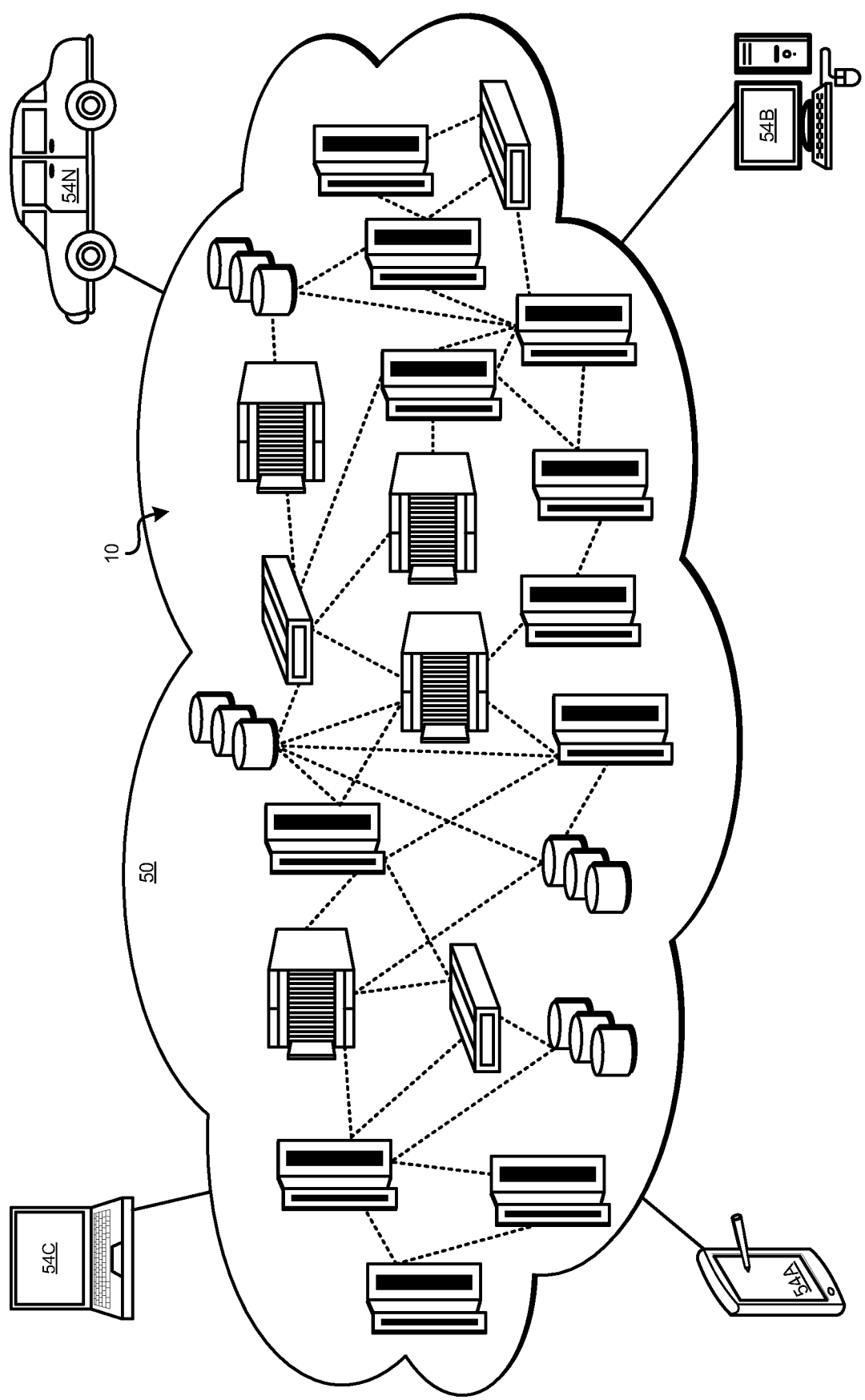
FIG. 14 depicts a cloud computing environment according to an embodiment of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 15:
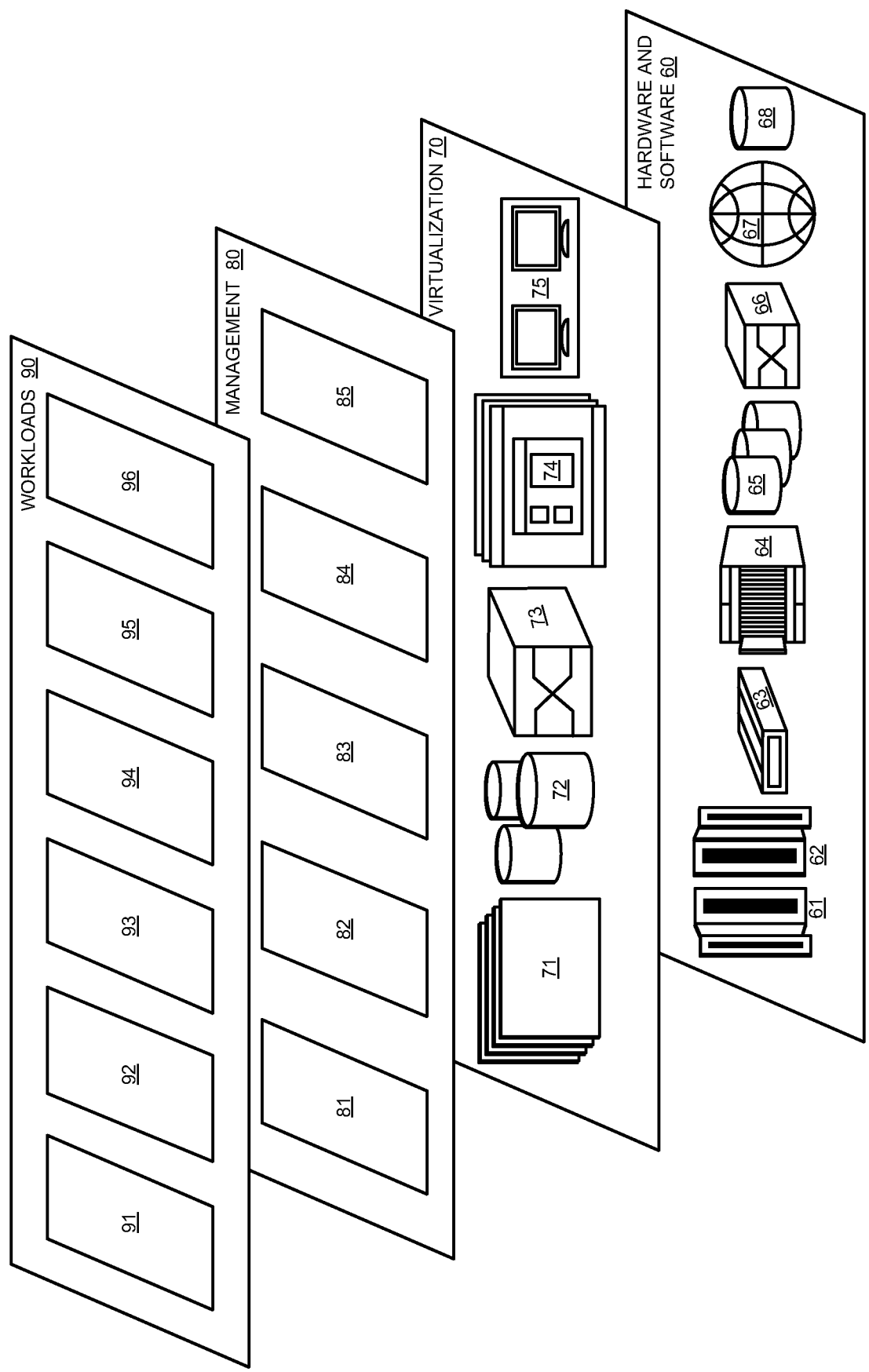
FIG. 15 depicts abstraction model layers according to an embodiment of the present invention.

Referring now to FIG. 15, a set of functional abstraction layers provided by cloud computing environment 50 (FIG. 14) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automatic neutral point of view content generation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
constructing, from a set of natural language text documents, a concept tree, a node of the concept tree representing a subject of a subset of the set of natural language text documents (subset), a level of the concept tree corresponding to a level of specificity of a subject of a node in the level;

adding a second set of natural language text documents to the subset, the adding resulting in a modified subset of natural language text documents, the modified subset having a polarity score within a predefined neutral polarity score range;

selecting, from the modified subset according to a sentence selection parameter, a bin of sentences, a sentence in the bin of sentences extracted from a selected document in the modified subset; and generating, by using at least a subset of the bin of sentences in a transformer deep learning narration generation model, a new natural language text document.

2. The computer-implemented method of claim 1, wherein the bin of sentences further comprises sentences extracted from a document represented by a second node of the concept tree, wherein the second node is a parent node of the node.

3. The computer-implemented method of claim 1, wherein the bin of sentences further comprises sentences extracted from a document represented by a third node of the concept tree, wherein the third node is a child node of the node.

4. The computer-implemented method of claim 1, further comprising:

removing, from the bin of sentences, the removing resulting in a filtered bin of sentences, a sentence having a factuality score below a threshold factuality score, wherein the factuality score of the sentence is determined by comparing the sentence to a search result returned from a repository of factual information, and wherein the subset of the bin of sentences is the filtered bin of sentences.

5. The computer-implemented method of claim 4, wherein to return the search result, a search within the repository of factual information is performed using a structured representation of the sentence and a structured representation of a textual variant of the sentence.

6. The computer-implemented method of claim 4, further comprising:

generating, from the filtered bin of sentences, a structured description of the filtered bin of sentences.

7. A computer program product for content generation, the computer program product comprising:

one or more computer readable storage media, and program instructions collectively stored on the one or more computer readable storage media, the program instructions when executed using a processor and a memory causing operations, the operations comprising:

constructing, from a set of natural language text documents, a concept tree, a node of the concept tree representing a subject of a subset of the set of natural language text documents (subset), a level of the concept tree corresponding to a level of specificity of a subject of a node in the level;

adding a second set of natural language text documents to the subset, the adding resulting in a modified subset of natural language text documents, the modified subset having a polarity score within a predefined neutral polarity score range;

selecting, from the modified subset according to a sentence selection parameter, a bin of sentences, a sentence in the bin of sentences extracted from a selected document in the modified subset; and generating, by using at least a subset of the bin of sentences in a transformer deep learning narration generation model, a new natural language text document.

8. The computer program product of claim 7, wherein the bin of sentences further comprises sentences extracted from a document represented by a second node of the concept tree, wherein the second node is a parent node of the node.

9. The computer program product of claim 7, wherein the bin of sentences further comprises sentences extracted from a document represented by a third node of the concept tree, wherein the third node is a child node of the node.

10. The computer program product of claim 7, the operations further comprising:

removing, from the bin of sentences, the removing resulting in a filtered bin of sentences, a sentence having a factuality score below a threshold factuality score, wherein the factuality score of the sentence is determined by comparing the sentence to a search result returned from a repository of factual information, and wherein the subset of the bin of sentences is the filtered bin of sentences.

11. The computer program product of claim 10, wherein to return the search result, a search within the repository of factual information is performed using a structured representation of the sentence and a structured representation of a textual variant of the sentence.

12. The computer program product of claim 10, the operations further comprising:

generating, from the filtered bin of sentences, a structured description of the filtered bin of sentences.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to construct, from a set of natural language text documents, a concept tree, a node of the concept tree representing a subject of a subset of the set of natural language text documents (subset), a level of the concept tree corresponding to a level of specificity of a subject of a node in the level;

program instructions to add a second set of natural language text documents to the subset, the adding resulting in a modified subset of natural language text documents, the modified subset having a polarity score within a predefined neutral polarity score range;

program instructions to select, from the modified subset according to a sentence selection parameter, a bin of sentences, a sentence in the bin of sentences extracted from a selected document in the modified subset; and program instructions to generate, by using at least a subset of the bin of sentences in a transformer deep learning narration generation model, a new natural language text document.

17. The computer system of claim 16, wherein the bin of sentences further comprises sentences extracted from a document represented by a second node of the concept tree, wherein the second node is a parent node of the node.

18. The computer system of claim 16, wherein the bin of sentences further comprises sentences extracted from a document represented by a third node of the concept tree, wherein the third node is a child node of the node.

19. The computer system of claim 16, further comprising:
program instructions to remove, from the bin of sentences to form a filtered bin of sentences, a sentence having a factuality score below a threshold factuality score, wherein the factuality score of the sentence is determined by comparing the sentence to a search result returned from a repository of factual information, and wherein the subset of the bin of sentences is the filtered bin of sentences.

20. The computer system of claim 19, wherein to return the search result, a search within the repository of factual information is performed using a structured representation of the sentence and a structured representation of a textual variant of the sentence.

21. The computer system of claim 19, further comprising:
program instructions to generate, from the filtered bin of sentences, a structured description of the filtered bin of sentences.

22. A data processing environment comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct, from a set of natural language text documents, a concept tree, a node of the concept tree representing a subject of a subset of the set of natural language text documents (subset), a level of the concept tree corresponding to a level of specificity of a subject of a node in the level;
program instructions to add a second set of natural language text documents to the subset, the adding resulting in a modified subset of natural language text documents, the modified subset having a polarity score within a predefined neutral polarity score range;
program instructions to select, from the modified subset according to a sentence selection parameter, a bin of sentences, a sentence in the bin of sentences extracted from a selected document in the modified subset; and
program instructions to generate, by using at least a subset of the bin of sentences in a transformer deep learning narration generation model, a new natural language text document.

23. The data processing environment of claim 22, wherein the bin of sentences further comprises sentences extracted from a document represented by a second node of the concept tree, wherein the second node is a parent node of the node.

24. The data processing environment of claim 22, wherein the bin of sentences further comprises sentences extracted from a document represented by a third node of the concept tree, wherein the third node is a child node of the node.

25. A natural language processing system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct, from a set of natural language text documents, a concept tree, a node of the concept tree representing a subject of a subset of the set of natural language text documents (subset), a level of the concept tree corresponding to a level of specificity of a subject of a node in the level;
program instructions to add a second set of natural language text documents to the subset, the adding resulting in a modified subset of natural language text documents, the modified subset having a polarity score within a predefined neutral polarity score range;
program instructions to select, from the modified subset according to a sentence selection parameter, a bin of sentences, a sentence in the bin of sentences extracted from a selected document in the modified subset; and
program instructions to generate, by using at least a subset of the bin of sentences in a transformer deep learning narration generation model, a new natural language text document.

* * * * *